United States Patent [19]

Nagasawa et al.

[11] Patent Number: 5,905,102

[45] Date of Patent: May 18, 1999

[54] AQUEOUS BLACK INK COMPOSITION FOR WRITING BOARD

[75] Inventors: Toshiyuki Nagasawa, Yawata; Tetsuji Kihara, Takatsuki; Sohko Itoh, Neyagawa, all of Japan

[73] Assignee: Orient Chemical Industries, Ltd., Osaka-Fu, Japan

[21] Appl. No.: 08/760,312

[22] Filed: Dec. 4, 1996

[30] Foreign Application Priority Data

Dec. 4, 1995 [JP] Japan .................................. 7-315227

[51] Int. Cl.$^6$ ...................................................... C09D 5/00
[52] U.S. Cl. .......................................... 523/161; 106/31.13
[58] Field of Search .......................... 160/31.13; 523/161

[56] References Cited

U.S. PATENT DOCUMENTS

| 4,444,866 | 4/1984 | Sakai ........................................ 430/220 |
| 5,395,435 | 3/1995 | Mizobuchi ................................. 106/27 |
| 5,609,671 | 3/1997 | Nagasawa ................................. 106/20 |
| 5,718,746 | 2/1998 | Nagasawa ............................... 106/31.9 |

FOREIGN PATENT DOCUMENTS

| 0679529A1 | 11/1995 | European Pat. Off. . |
| 0688836A2 | 12/1995 | European Pat. Off. . |
| 0733682A1 | 9/1996 | European Pat. Off. . |
| 7018991 | 1/1972 | Netherlands . |

*Primary Examiner*—Paul R. Michl
*Attorney, Agent, or Firm*—Birch, Stewart, Kolasch & Birch, LLP

[57] ABSTRACT

The present invention provides an aqueous black ink composition for a writing board which hardly causes thickening, coagulation of the pigment, decreasing of writing density due to sedimentation, clogging in a penpoint, and break in writing. The aqueous black ink composition comprises water, the oxidized carbon black obtained by oxidizing carbon black using hypohalogenous acid and/or salt thereof, a film forming agent, and a release agent.

11 Claims, No Drawings

AQUEOUS BLACK INK COMPOSITION FOR WRITING BOARD

FIELD OF THE INVENTION

The present invention relates to an aqueous black ink composition for a writing board, which may be written on the writing board such as a white board by using a marking pen, and the written ink composition being wiped off when it becomes unnecessary.

BACKGROUND OF THE INVENTION

A black ink composition for a writing board has conventionally been prepared by dispersing a carbon black coloring agent in an organic solvent such as a ketone or a lower alcohol solvent with a dispersing agent, and by adding a release agent, a surfactant and the like.

However, the organic solvent gives a bad influence on atmosphere and a human body, and the use of the organic solvent tends to be restricted recently. Therefore, also regarding an ink composition for a writing board, an aqueous black ink composition is desired.

Examples of a conventional aqueous black ink composition for a writing board includes: the composition obtained by dispersing a pigment in an aqueous vehicle comprising an ester compound such as di(polyalkylene glycol ether) dicarboxylate and a resin composed of (partially saponified) vinyl acetate polymer, disclosed in Japanese Patent Kokai Publication 117975/1990; the composition comprising a silicone powder and a compound selected from an aqueous ester compound and a polyether modified silicone oil, in combination, as a release agent, disclosed in Japanese Patent Kokai Publication 239569/1992; the composition comprising a film forming resin, a blue pigment water dispersion and an aliphatic carboxylate emulsion, disclosed in Japanese Patent Kokai Publication 16991/1994; the composition comprising a specific phosphate compound as a release agent, disclosed in Japanese Patent Kokai Publication 184486/1994; and the composition comprising pentaerythritol fatty ester, polyglycerol fatty ester, oxyacid ester and the like as a release agent, disclosed in Japanese Patent Kokai Publication 264019/1994.

In these aqueous black ink compositions for a writing board, the vehicles and the release agents contained are those which is suitable for an aqueous pigment dispersion, by comparison with a conventional solvent-based marking ink composition for a writing board, but the pigment used is the same carbon black as that conventionally used in the solvent-based black ink composition.

Therefore, the aqueous black ink compositions for a writing board disclosed hereinabove easily cause thickening, coagulation of pigment, decreasing of writing density due to sedimentation, clogging in a penpoint, and break in writing, when they are filled in a marking pen and used repeatedly for a long period.

SUMMARY OF THE INVENTION

The present invention solves the above-described problems, and provides an aqueous black ink composition for a writing board comprising water, the oxidized carbon black obtained by oxidizing carbon black using hypohalogenous acid and/or salt thereof, a film forming agent, and a release agent.

The aqueous black ink composition of the present invention hardly causes thickening, coagulation of the pigment, decreasing of writing density due to sedimentation, clogging in a penpoint, and break in writing.

DETAILED DESCRIPTION OF THE INVENTION

In the instant specification, the term "aqueous" means that water only, or a mixture of water as a main component and a water miscible organic solvent, is used as a liquid medium. In general, water as a main component is present at least 50% by weight in the total solvent.

In the aqueous black ink composition for a writing board of the present invention, though water may be used alone as the liquid medium, a suitable amount of the water miscible organic solvent may also be used in combination. The water miscible organic solvent is used in an amount up to 50% by weight, preferably from 1 to 30% by weight, more preferably from 3 to 20% by weight of the liquid solvent.

Specific examples of the water miscible organic solvent which can be used include alkyl alcohols having 1 to 4 carbon atoms such as methyl alcohol, ethyl alcohol, n-propyl alcohol, isopropyl alcohol, n-butyl alcohol, sec-butyl alcohol and isobutyl alcohol; ketone or ketone alcohols such as acetone and diacetone alcohol; ethers such as tetrahydrofuran (THF) and dioxane; alkylene glycols such as ethylene glycol, propylene glycol, diethylene glycol and triethylene glycol; polyalkylene glycols such as polyethylene glycol and polypropylene glycol; lower alkyl ethers of polyhydric alcohol such as ethylene glycol monoethyl ether, propylene glycol monomethyl ether, diethylene glycol monomethyl ether and triethylene glycol monoethyl ether; lower alkyl ether acetates such as polyethylene glycol monomethyl ether acetate; glycerol; and pyrrolidones such as 2-methyl pyrrolidone and N-methyl-2-pyrrolidone; and the like.

Polyols such as alkylene glycol, polyalkylene glycol, lower alkyl ether, lower alkyl ether acetate and glycerol can also be used as the water miscible organic solvent. These polyols act also as a release agent later explained.

The oxidized carbon black used as a coloring agent in the aqueous black ink composition for a writing board of the present invention is obtained by oxidizing commercial carbon black for coloring with hypohalogenous acid and/or salt thereof.

The carbon black is essentially hydrophobic and does not have water-dispersibility. Thus, various methods are known and conducted in order to improve the water-dispersibility of the carbon black. The various modified carbon black treated by the method are commercially available.

Such a carbon black is generally called acidic carbon black, since it has a small amount of carboxyl groups on the surface of the particles, and shows acidity.

However, the acidic carbon black does not disperse sufficiently in water, and a long mechanical dispersing treatment is necessary when it is used as a coloring agent for an aqueous pigment ink composition. Further, the acidic carbon black easily precipitates from the aqueous pigment ink composition when stored for a long period.

On the other hand, oxidized carbon black used in the aqueous black ink composition for a writing board of the present invention is extremely hydrophilic and has excellent water-dispersibility. The oxidized carbon black is obtained by oxidizing the carbon black in water using hypohalogenous acid and/or a salt thereof as an oxidizing agent. As the salt of hypohalogenous acid, sodium hypochlorite, potassium hypochlorite and the like are used, and sodium hypochlorite is particularly preferable from the view point of reactivity.

The process for oxidizing carbon black is illustrated as follows. The carbon black is charged into a reaction vessel filled with ion exchanged water, and is stirred until the carbon black particles are dispersed finely, that is, until the carbon black particles have an average particle size of not more than 300 nm, preferably from 200 to 30 nm, more preferably about 100 nm.

The resulting dispersion is heated to 50° C. with stirring, an aqueous hypohalite solution is added, and the mixture is refluxed at 95 to 105° C. for 5 to 20 hours.

The carbon black may otherwise be oxidized by the process comprising: dispersing the carbon black finely in water with stirring as described above, and introducing a chlorine gas in the water dispersion of the carbon black to generate hypochlorous acid.

Then, unreacted carbon black and coarse particles are removed from the dispersion after the oxidation reaction, and the dispersion is purified and concentrated. The unreacted carbon black and coarse particles can be removed by using a wire cloth of about 400 mesh. The purification and concentration can be carried out, for example, by using a separating membrane having an aperture of not more than 0.01 μm (for example, a ultrafiltration membrane, a reverse osmosis membrane and the like). The water dispersion of the oxidized carbon black after the oxidation reaction is generally concentrated to a pigment content of from 10 to 50% by weight.

The finely dispersing step and the oxidizing step of the carbon black may be conducted simultaneously. That is, an aqueous medium, carbon black and hypohalite are well mixed in an appropriate proportion, to this is added a mill medium, and the mixture is dispersed by a dispersing machine with heating usually for about 2 to 20 hours, preferably for about 3 to 10 hours.

An oxygen atom is introduced in the surface of the carbon black particles by the oxidation reaction. As a result, a hydrophilic group such as a hydroxide group or a carboxyl group is formed on the surface of the carbon black particles, and hydrophilicity and water dispersibility of the carbon black particles are improved. The degree of oxidation of the oxidized carbon black is shown by oxygen content and active hydrogen content.

The oxygen content of the oxidized carbon black means the % by weight of oxygen included in the carbon black, and can be measured, for example, according to the inert gas fusion-infrared ray absorption method (JISZ2613-1976). The oxidized carbon black used in the present invention has a oxygen content of from 3 to 30%, preferably from 7 to 25%. When the oxygen content of the oxidized carbon black is lower than 3%, affinity for water becomes poor.

The active hydrogen content of the oxidized carbon black means the molar amount of active hydrogens included in hydrophilic groups on the surface of the oxidized carbon black particles, and can be measured, for example, by Zeisel's method. The oxidized carbon black used in the present invention has an active hydrogen content of not less than 1 mmol/g, preferably not less than 1.5 mmol/g. When the active hydrogen content of the oxidized carbon black is lower than 1 mmol/g, water dispersibility becomes poor, and it becomes difficult to attain the effects of the present invention.

An acidic group such as the carboxyl group formed on the surface of the oxidized carbon black particles in the oxidation reaction, forms at least partially a salt with a cation derived from the hypohalite, thereby water dispersibility of the carbon black particles is further improved.

Preferably, at least a part of the hydrophilic groups existing on the surface of the oxidized carbon black particles is in the form of an alkaline metal salt, particularly preferably in the form of a sodium salt. As a result, the oxidized carbon black is finely dispersed in an aqueous medium, and a marking pen and the like are prevented from corrosion.

The object of the present invention can preferably be attained by making the average particle size of the oxidized carbon black not more than 300 nm, preferably from 200 to 300 nm, more preferably about 100 nm. When the average particle size of the oxidized carbon black is over 300 nm, sedimentation of the pigment may occur.

The carbon black which is a raw material of the oxidized carbon black used in the present invention is usually obtained by thermal decomposition or incomplete combustion of a natural gas, or liquid hydrocarbon (heavy oil, tar or the like). The carbon black is generally classified as channel black, furnace black, lamp black and the like, depending on the production method, and is commercially available.

The carbon black used in the present invention is not particularly restricted. Any of alkaline, neutral or acidic carbon black can be used.

The carbon black as described above is commercially available, and the specific examples include #10B, #20B, #30, #33, #44, #45, #50, #55, #95, #260, #900, #1000, #2200B, #2300, #2350, #2400B, #2650, #2700, #4000B, CF9, MA8, MA11, MA77, MA100, MA220, MA230, MA600, MCF88 and the like manufactured by Mitsubishi Kagaku K.K.; Monarch 120, Monarch 700, Monarch 800, Monarch 880, Monarch 1000, Monarch 1100, Monarch 1300, Monarch 1400, Mogul L, Regal 99R, Regal 250R, Regal 300R, Regal 330R, Regal 400R, Regal 500R, Regal 660R and the like manufactured by Cabot Ltd.; Printex A, Printex G, Printex U, Printex V, Printex 55, Printex 140U, Printex 140V, Special black 4, Special black 4A, Special black 5, Special black 6, Special black 100, Special black 250, Color black FW1, Color black FW2, Color black FW2V, Color black FW18, Color black FW200, Color black S160, Color black S170 and the like manufactured by Degussa Ltd.

The carbon black having low oil absorption is preferred. The carbon black used in the present invention has an oil absorption measured according to JIS-K6221 preferably not more than 150 ml/100 g, more preferably not more than 80 ml/100 g, since such carbon black is easily dispersed finely after oxidation, and provides excellent effects in a pen body.

The oxidized carbon black is included in the aqueous black ink composition for a writing board of the present invention in an amount of from 0.5 to 20% by weight, preferably from 2 to 10% by weight, more preferably from 2 to 7% by weight based on the total amount of the ink composition. When the content is less than 0.5% by weight, density of the ink composition becomes poor and insufficient for a marking pen. When the content is more than 20% by weight, a large amount of a film forming resin is required for the ink composition to keep good erasability, as a result, viscosity of the ink may become too high for writing.

In the aqueous black ink composition for a writing board of the present invention, a film forming resin is used in order to impart film forming ability to the ink composition. The film forming resin dissolves or disperses in the liquid medium used, gives no bad influence on dispersibility of the pigment, and has such adhesion to a writing board that the resulting film after drying can be wiped off from the writing board.

Examples of the film forming resin include water soluble resins such as polyvinyl acetate, polyvinyl formal, polyvinyl acetal, polyvinyl alcohol, a water soluble acrylic resin and a water soluble maleic resin; and emulsions of water insoluble resins such as an alkyd resin, an urethane resin and an acrylic resin, and the like. These resins are commercially available, and the specific examples include "Joncryl J62" manufactured by Johnson polymer Ltd., "Polysol PS" manufactured by Showa polymer K.K., "Kuraray POVAL PVA203" and "Kuraray POVAL L-8" manufactured by Kuraray K.K., and the like.

The amount to be used of the film forming resin is usually from about 1 to 20% by weight, preferably from about 2 to 10% by weight based on the total amount of the ink composition.

The release agent (erasing agent) is an additive to release (erase) written ink on a writing board when the written ink on the writing board with the aqueous black ink composition for a writing board of the present invention becomes unnecessary. When the film forming resin and the pigment are dried and precipitated as particles after writing, the release agent surrounds the particles and enables wiping off of the written ink. If the release agent is completely compatible with the film forming resin, the written ink remains as stains in releasing (wiping), on the other hand if the release agent is not compatible with the resin at all, the written ink on a writing board becomes hard and difficult to release with a lapse of time. Therefore, it is preferred that the release agent have suitable compatibility with the film forming resin.

As the release agent in the aqueous black ink composition for a writing board of the present invention, there can be used a nonvolatile substance which is liquid at ambient temperature and which conventionally used in a solvent-based (ketone-ester or alcohol) black ink composition for a writing board. Examples include higher fatty esters, glycols, ethers thereof, polyhydric alcohol fatty esters, higher aliphatic hydrocarbons, polyoxyethylene alkylether nonionic surfactants and derivatives thereof, polyoxyethylene alkylphenolether nonionic surfactants and derivatives thereof, and the like. Particularly preferable examples include higher fatty esters, polyglycerol fatty esters, polyethylene glycols, polypropylene glycols, and alkylene glycol polycondensates.

Specific examples of the preferable higher fatty esters include myristyl caproate, isostearyl caproate, oleyl caproate, isostearyl caprylate, oleyl caprylate, stearyl 2-ethylhexanoate, isostearyl 2-ethylhexanoate, oleyl 2-ethylhexanoate, cetyl 2-ethylhexanoate, isooctadecyl caprate, oleyl caprate, isooctyl palmitate, isooctadecyl palmitate, diethylene glycol monobutyl palmitate, isooctyl stearate, isooctadecyl stearate, isostearyl isostearate, isocetyl isostearate, 2-ethylhexyl isostearate, isopropyl myristate, lauryl oleate, butyl oleate and the like.

Examples of the preferable glycols and ethers thereof include ethylene glycol, diethylene glycol, propylene glycol, 2,5-hexane diol, liquid polyethylene glycol, polypropylene glycol, higher alkyl ethers of ethylene glycol and propylene glycol, glycerol tripolyethylenepolypropylene glycol ether, sorbitan propylene oxide adduct and the like.

The release agent can be used alone or in combination of more than one, and the amount to be used of the release agent is from about 50 to 200% by weight, preferably from 100 to 150% by weight based on the total amount of the pigment and the film forming resin. When the amount of the release agent is less than 50% by weight, erasability of the written ink may become poor, and when over 200% by weight, the written ink may become uneven, and density of the written ink may become poor.

A mixture of the additives which shows releasing effect may be used in the aqueous black ink composition for a writing board of the present invention. Typically, the emulsion obtained by mixing a release agent, a release aid, a dry-controlling agent, an emulsion stabilizer and the like by a high speed dissolver, is employed (The emulsion is described as "release agent emulsion" hereinafter.).

The surfactant as the release aid emulsifies the above-described release agent stably in a liquid medium, and after writing, mixes with the film forming resin at a constant size of the emulsion. Any surfactant selected from the group consisting of anionic, cationic and nonionic surfactants, may be used. The amount to be used is well known to those skilled in the art, and usually from 3 to 30% by weight of the release agent.

Specific examples of the release aid include polyoxyethylene alkylether, polyoxyethylenepolyoxypropylene glycol ether, polyoxyethylenepolyoxypropylene alkyl ether, polyoxyethylene fatty ester, polyoxyethylene alkyl ether fatty ester, polyoxyethylene alkyl ether fatty salt, sorbitan fatty ester, polyethylene glycol fatty ester, glycerol fatty ester, polyoxyethylene alkyl ether sulfate, alkyl sulfate, alkyl phosphate, polyoxyethylene alkyl phosphate, alkylnaphthalene sulfonate, alkylamine, quaternary ammonium salt and the like.

As a dry-controlling agent or an emulsion stabilizer, for example, a glycol solvent, a glycol ether solvent, an alcohol solvent, a glycerol solvent, 2-pyrrolidone, dimethylimidazolidinone, γ-butyrolactone and the like, are employed. These may be used in an amount of from 1 to 30% by weight based on the total amount of the aqueous black ink composition for a writing board.

The aqueous black ink composition for a writing board of the present invention may optionally be blended with known various additives conventionally used. As these additives, for example, a preservative, a mildewproofing agent, a film-regulating agent, a dry-controlling agent, a cap off anti-drying agent, a defoaming agent, a pH regulator and the like are included.

The preferable process for producing the aqueous black ink composition for a writing board of the present invention includes: a step in which an aqueous dispersion of carbon black is provided; a step in which an aqueous dispersion of oxidized carbon black is prepared by oxidizing the dispersed carbon black using a hypohalogenous acid and/or salt thereof; a step in which a release agent emulsion is separately prepared; and a step in which the aqueous dispersion of the oxidized carbon black, the release agent emulsion, the film forming agent and the other additives (a preservative, a mildewproofing agent, a film forming regulation agent, a dry-controlling agent, a cap off anti-drying agent, a defoaming agent, a pH regulator and the like) are mixed and dispersed, and made into an ink.

More preferably, the aqueous black ink composition for a writing board of the present invention is prepared according to the process comprising:

mixing the carbon black with water, preferably ion exchanged water;

stirring the resulting mixture until the carbon black particles are dispersed finely, that is, until the carbon black particles have an average particle size of not more than 300 nm, preferably from 200 to 30 nm, more preferably about 100 nm;

oxidizing the carbon black in water using hypohalogenous acid and/or salt thereof as an oxidizing agent;

adding a film forming agent, a release agent and the additives to the aqueous dispersion of the oxidized carbon black; and stirring until the resulting dispersion becomes uniform.

The present invention is illustrated by the following Examples which, however, are not to be construed as limiting the present invention to their details. The amount represented "part" or "%" herein are "part by weight" or "% by weight" unless otherwise indicated.

EXAMPLES

Example 1

A) Preparation of aqueous dispersion of oxidized carbon black 300 g of carbon black having a DBP oil absorption of 50 ml/100 g (commercially available as "#45" from Mitsubishi Kagaku K.K.) and 2,700 ml of water were charged in a 5,000 ml four-necked flask and thoroughly mixed. 1000 ml of glass beads were added to the flask and stirred. After stirring one hour, 500 g of sodium hypochlorite (effective chlorine concentration of 12%) was added and stirred at 100 to 105° C. for 10 hours.

The resulting dispersion was then filtered to separate the glass beads and wet filter cake was re-dispersed in 3,000 ml of water, and desalted and purified by means of an ultrafiltration membrane until the electric conductivity of the dispersion becomes 0.5 mS. The dispersion was then concentrated to an oxidized carbon black content of 20%.

The aqueous dispersion of the oxidized carbon black had a viscosity of 2.5 cps at 25° C. The oxidized carbon black had an average particle size of 60 nm, and it was produced at an yield of 85%.

Oxygen content of the oxidized carbon black was analyzed. The carbon black used as a raw material had an oxygen content of 0.7%, but the oxidized carbon black showed an oxygen content of 8.5%. Therefore, it was shown that the resulting oxidized carbon black was sufficiently oxidized.

B) Preparation of release agent emulsion (1) Solution B-1: 50 parts of 2-ethylhexyl isostearate and 5 parts of higher alcohol (commercially available as "HA18G" from Mitsubishi Kagaku K.K.) were mixed together thoroughly.

(2) Solution B-2: 30 parts of water, 10 parts of glycerol and 5 parts of polyoxyethylene alkyl phosphate (commercially available as "Plysurf M208B" from Daiichi Kogyo Seiyaku K.K.) were thoroughly mixed together in a separate vessel.

(3) Solution B-2 was stirred at a revolution of 5,000 rpm in "Disolver" (made by Tokushu Kika K.K.). Solution B-1 was added thereto, and stirred for 15 minutes to obtain the release agent emulsion.

C) Preparation of aqueous black ink composition for writing board 55 parts of water was stirred, and 10 parts of 34% aqueous solution of styrene-acrylic resin (commercially available as "Joncryl J62" from Johnson Polymer K.K.), 20 parts of the aqueous dispersion of the oxidized carbon black (A) and 15 parts of the release agent emulsion (B) were added in the order, followed by stirring 1 hour to produce the aqueous black ink composition for a writing board.

The ink composition was set in a marking pen and evaluated. The results were that density of the ink composition was not decreased, and a penpoint of the pen did not clogged, even after a long period of storage with the penpoint directed upward and downward. The ink written on the white board could be erased by wiping it softly. Results of the evaluation are shown in Table 2.

Method for Testing Physical Properties

Viscosity of aqueous dispersion of oxidized carbon black

The aqueous dispersion of the oxidized carbon black having a carbon black content of 20% was prepared. Viscosity of the aqueous dispersion was measured by using an E type viscometer (commercially available as "ELD" from Tokyo Keiki K.K.).

Average particle size of oxidized carbon black

The measurement was conducted by using a dynamic light diffusion type measuring apparatus (commercially available as "Microtrack UPA" manufactured by Leeds & Morthrup K.K., having a laser doppler diffused light analysis system).

Oxygen content of oxidized carbon black

The measurement was conducted by the inert gas fusion-infrared ray absorption method described in JISZ2613-1976.

TABLE 1

Conditions for analysis

Analyzer: HERAEUS CHN-O RAPIO Automatic Element Analyzer

Temperature of sample decomposing oven: 1,140° C.

Temperature of fractional distillation tube: 1,140° C.

Gas used: 95% $N_2$/5% $H_2$ mixed gas

Flow of gas: 70 ml/min

Detector: Non-dispersing type spectrophotometer (Binos)

Density change with time of aqueous black ink composition for writing board

A sample was set in a marking pen, a penpoint of the marking pen was oriented upward, and the marking pen was stored for three months in that state. Density of the written ink after storage was compared with that before storage, and evaluated according to the following criteria.

⊚: No decreasing in density by comparison with that before storage

○: Slight decreasing in density by comparison with that before storage, but usable for a marking pen Δ: 50% or more decreasing in density by comparison with that before storage, and not usable for a marking pen X: Remarkable decreasing in density, and the written ink has extremely thin color.

Clogging of penpoint with time

A sample was set in a marking pen, a penpoint of the marking pen was oriented downward, and the marking pen was stored for three months in that state. Clogging of the penpoint after storage was evaluated according to the following criteria.

⊚: No clogging is found.

○: Clogging, but it recovers as writing of not more than 1 cm, and can be written smoothly thereafter.

Δ: Clogging, it recovers as writing, but the written ink is breaks.

X: Clogging, and cannot be written.

Erasability of written ink on writing board

A sample was set in a marking pen and wrote some characters on a writing board. A piece of tissue paper with a 100 g weight thereon was put on the characters, and dragged the paper therearound. Erasability of the written ink on writing board was evaluated according to the following criteria.

⊚: The characters are erased by one or two dragging.

○: The characters are erased by three to five dragging.

Δ: The characters are erased by not less than five dragging.

X: The characters are not erased even after many times of dragging.

Example 2

A) Preparation of aqueous dispersion of oxidized carbon black 200 g of carbon black having a DBP oil absorption of 150 ml/100 g (commercially available as "Color black S160" from Degussa Ltd.) and 2,500 ml of water were charged in a 5,000 ml four-necked flask and thoroughly mixed. After stirring one hour, 400 g of sodium hypochlorite (effective chlorine density of 12%) was added and stirred at 100 to 105° C. for 15 hours.

The resulting dispersion was then filtered and wet filter cake was re-dispersed in 3,000 ml of water, and desalted and purified by means of an ultrafiltration membrane until the electric conductivity of the dispersion becomes 0.3 mS. The dispersion was then concentrated to an oxidized carbon black content of 20%.

The aqueous dispersion of the oxidized carbon black had a viscosity of 8 cps at 25° C. The oxidized carbon black had an average particle size of 180 nm and it was produced at an yield of 85%.

Oxygen content of the oxidized carbon black was analyzed. The carbon black used as a raw material had an oxygen content of 1.6%, but the oxidized carbon black showed an oxygen content of 8.3%. Therefore, it was shown that the resulting oxidized carbon black was sufficiently oxidized.

B) Preparation of release agent emulsion (1) Solution B-1: 48 parts of lauryl oleate and 7 parts of higher alcohol (commercially available as "HA26G" from Mitsubishi Kagaku K.K.) were mixed together thoroughly.

(2) Solution B-2: 30 parts of water, 10 parts of diethylene glycol, and 10 parts of polyoxyethylene polyoxypropylene glycol ether (commercially available as "Epan 740" from Daiichi Kogyo Seiyaku K.K.) were thoroughly mixed together in a separate vessel.

(3) Solution B-2 was stirred at a revolution of 5,000 rpm in a dissolver. Solution B-1 was added thereto, and stirred for 15 minutes to obtain the release agent emulsion.

C) Preparation of aqueous black ink composition for writing board 53 parts of water was stirred, and 7 parts of 50% aqueous emulsion of polyvinyl acetate (commercially available as "Polysol PS" from Showa Polymer K.K.), 20 parts of the aqueous dispersion of the oxidized carbon black (A) and 20 parts of the release agent emulsion (B) were added in the order, followed by stirring 1 hour to produce the aqueous black ink composition for a writing board.

The ink composition was set in a marking pen and evaluated according to substantially the same manner as described in Example 1. The results were that no decrease in density nor clogging of the penpoint were observed even after the storage, and that the written ink on a white board could be erased by wiping softly. Results of evaluation are shown in Table 2.

Example 3

A) Preparation of aqueous dispersion of oxidized carbon black

An aqueous dispersion of the oxidized carbon black was prepared in substantially the same manner as described in Example 1, except that the carbon black having a DBP oil absorption of 45 ml/100 g (commercially available as "#2400B" from Mitsubishi Kagaku K.K.) was used instead of the carbon black having an oil absorption of 50 ml/100 g (commercially available as "#45" from Mitsubishi Kagaku K.K.).

The aqueous dispersion of the oxidized carbon black had a viscosity of 5 cps at 25° C. and an average particle size of 80 nm, and it was produced at an yield of 90%.

B) Preparation of release agent emulsion (1) Solution B-1 was prepared according to substantially the same manner as described in Example 1, except that the isooctadecyl palmitate was used instead of 2-ethylhexyl isostearate, and the higher alcohol (commercially available as "HA22G" from Mitsubishi Kagaku K.K.) was used instead of the higher alcohol (commercially available as "HA18G" from Mitsubishi Kagaku K.K.).

(2) Solution B-2 was prepared according to substantially the same manner as described in Example 1, except that polyoxypropylene modified glycerol (commercially available as "Sunnix GP250" from Sanyo Kasei K.K.) was used instead of glycerol, and polyoxyethylenepolyoxypropylene alkyl ether (commercially available as "PEN-4620" from Nikko Chemical K.K.) was used instead of polyoxyethylene alkyl phosphate (commercially available as "Prisurf M208B" from Daiichi Kogyo Seiyaku K.K.).

(3) The release agent emulsion was prepared according to substantially the same manner as described in Example 1.

C) Preparation of aqueous black ink composition for writing board

An aqueous black ink composition for writing board was prepared according to substantially the same manner as described in Example 1, except that 62 parts of water and 3 parts of polyvinyl alcohol (commercially available as "Kuraray Poval L-8" from Kuraray K.K.) were used instead of 55 parts of water and 10 parts of 34% aqueous styrene-acrylic resin solution (commercially available as "Joncryl J62" from Johnson Polymer K.K.).

The ink composition was set in a marking pen and evaluated according to substantially the same manner as described in Example 1. The results were that no decrease in density nor clogging of the penpoint were observed even after the storage, and that the written ink on a white board could be erased by wiping softly. Results of evaluation are shown in Table 2.

Example 4

A) Preparation of aqueous dispersion of oxidized carbon black 300 g of carbon black having a DBP absorption of 55 ml/100 g (commercially available as "#900" from Mitsubishi Kagaku K.K.) and 2,700 g of water were dispersed for 3 hours in a horizontal wet dispersing machine filled with zirconia beads having a diameter of 1 mm, to obtain an aqueous dispersion of the carbon black. 3,000 g of the resulting dispersion was charged in a four-necked flask and 1,500 g of sodium hypochlorite (effective chlorine density of 12%) was added, followed by oxidizing at 100 to 105° C. for 8 hours. The oxidized solution was then filtered and wet filter cake was re-dispersed in 3,000 ml of water. The dispersion was desalted and purified by means of an ultrafiltration membrane until the electric conductivity of the dispersion becomes 0.2 mS. The dispersion was then concentrated to an oxidized carbon black content of 20%.

The aqueous dispersion of the oxidized carbon black had a viscosity of 4 cps at 25° C. and an average particle size of 50 nm, and it was produced at an yield of 80%.

Oxygen content of the oxidized carbon black was analyzed. The carbon black used as a raw material had an oxygen content of 0.5%, but the oxidized carbon black showed an oxygen content of 11.5%. Therefore, it was shown that the resulting oxidized carbon black was sufficiently oxidized.

B) Preparation of release agent emulsion (1) Solution B-1: 50 parts of isostearyl 2-ethyl hexanoate and 5 parts of the higher alcohol (commercially available as "HA18G" from Mitsubishi Kagaku K.K.) were mixed together thoroughly.

(2) Solution B-2: 30 parts of water, 10 parts of glycerol, and 5 parts of polyoxyethylene alkyl ether sulfate (commercially available as "Hitenol N07" from Daiichi Kogyo Seiyaku K.K.) were mixed together thoroughly in a separate vessel.

(3) Solution B-2 was stirred in a dissolver at a revolution of 5,000 rpm and Solution B-1 was added thereto, and stirred for 15 minutes to obtain the release agent emulsion.

C) Preparation of aqueous black ink composition for writing board 61 parts of water was stirred, and 3 parts of polyvinyl alcohol (commercially available as "Kuraray Poval PVA203" from Kuraray K.K.) was dissolved in it. 15 parts of the aqueous dispersion of the carbon black (A) and 20 parts of the release agent emulsion (B) were added in the order, followed by stirring for 1 hour to produce the aqueous black ink composition for a writing board.

The ink composition was set in a marking pen and evaluated according to substantially the same manner as described in Example 1. The results were that no decrease in density nor clogging of the penpoint were observed even after the storage, and that the written ink on a white board could be erased by wiping softly. Results of evaluation are shown in Table 2.

Example 5

A) Preparation of aqueous dispersion of oxidized carbon black

An aqueous dispersion of the oxidized carbon black was prepared according to substantially the same manner as described in Example 4, except that the carbon black having a DBP oil absorption of 170 ml/100 g (commercially available as "Color Black FW1" from Degussa K.K.) was used instead of the carbon black having a DBP oil absorption of 55 ml/100 g (commercially available as "#900" from Mitsubishi Kagaku K.K.).

The aqueous dispersion of the oxidized carbon black had a viscosity of 4 cps at 25° C. and an average particle size of 130 nm, and it was produced at an yield of 75%.

B) Preparation of release agent emulsion (1) Solution B-1 was prepared according to substantially the same manner as described in Example 4, except that diethylene glycol monobutyl palmitate (commercially available as "HA18G" from Mitsubishi Kagaku K.K.) was used instead of isostearyl 2-ethylhexanoate, and that the higher alcohol (commercially available as "HA26G" from Mitsubishi Kagaku K.K.) was used instead of the higher alcohol (commercially available as "HA18G" from Mitsubishi Kagaku K.K.).

(2) Solution B-2 was prepared according to substantially the same manner as described in Example 4, except that polyoxypropylene modified glycerol (commercially available as "Sunnix GP 3000" from Sanyo Kasei K.K.) was used instead of glycerol, and that polyoxyalkylphosphate (commercially available as "Phosphanol LB 400" from Toho Kagaku K.K.) was used instead of polyoxyethylene alkyl ether sulfate (commercially available as "Hitenol N07" from Daiichi Kogyo Seiyaku K.K.).

(3) The release agent emulsion was prepared according to substantially the same manner as described in Example 4.

C) Preparation of aqueous black ink composition for writing board

An aqueous black ink composition for writing board was prepared according to substantially the same manner as described in Example 4, except that polypropylene oxide (commercially available as "Paogen PP-15" from Daiichi Kogyo Seiyaku K.K.) was used instead of polyvinyl alcohol (commercially available as "Kuraray Poval PVA 203" from Kuraray K.K.).

The ink composition was set in a marking pen and evaluated according to substantially the same manner as described in Example 1. The results were that no decrease in density nor clogging of the penpoint were observed even after the storage, and that the written ink on a white board could be erased by wiping softly. Results of evaluation are shown in Table 2.

Comparative Example 1

A) Preparation of aqueous dispersion of carbon black 500 g of the carbon black having a DBP oil absorption of 50 ml/100 g (commercially available as "#45" from Mitsubishi Kagaku K.K.), 500 g of 34% aqueous solution of styrene-acrylic resin (commercially available as "Joncryl J62" from Johnson Polymer Ltd.), and 500 g of ion-exchanged water were pre-mixed in a dissolver. The premix was dispersed by using a horizontal wet dispersing machine filled with zirconia beads until the average particle size of the carbon black becomes 75 nm. The dispersion was then diluted with water to a carbon black content of 20%.

B) Preparation of release agent emulsion

The release agent emulsion was prepared according to substantially the same manner as described in Example 1.

C) Preparation of aqueous black ink composition for writing board 20 parts of the aqueous dispersion of the carbon black described in (A) was stirred, and the solution obtained by diluting 20 parts of the release agent emulsion described in (B) with 60 parts of water, was added slowly. After completion of addition, the dispersion was stirred for one hour to obtain an aqueous black ink composition for a writing board.

The ink composition was set in a marking pen and evaluated according to substantially the same manner as described in Example 1. The results were that decreasing of density and clogging of the penpoint occurred after the storage, and that the written ink could not be erased by wiping softly. The results of the evaluation are given in Table 2.

Comparative Example 2

A) Preparation of aqueous dispersion of carbon black 350 g of polyvinyl alcohol (commercially available as "Kuraray Poval PVA203" from Kuraray K.K.) was completely dissolved in 1,000 g of water, and 500 g of carbon black having a DBP oil absorption of 50 ml/100 g (commercially available as "#900" from Mitsubishi Kagaku K.K.) was added and they were pre-mixed in a dissolver. The premix was dispersed by using a horizontal wet dispersing machine filled with zirconia beads until the average particle size of the carbon black becomes 95 nm. The dispersion was then diluted with water to a carbon black content of 20%.

B) Preparation of release agent emulsion

The release agent emulsion was prepared according to substantially the same manner as described in Example 4.

C) Preparation of aqueous black ink composition for writing board 20 parts of the aqueous dispersion of the carbon black described in (A) was stirred, and the solution obtained by diluting 20 parts of the release agent emulsion described in (B) with 60 parts of water, was added slowly. After completion of addition, the dispersion was stirred for one hour to obtain an aqueous black ink composition for a writing board.

The ink composition was set in a marking pen and evaluated according to substantially the same manner as described in Example 1. The results were that decreasing of density and clogging of the penpoint occurred after the storage, and that the written ink could not be erased by wiping softly. The results of the evaluation are given in Table 2.

Comparative Example 3

Omission of release agent emulsion described in the present invention 30 g of polyvinyl alcohol (commercially available as "Kuraray Poval PVA 203" from Kuraray K.K.) was dissolved in 730 g of water, and 40 g of commercially available carbon black having a DBP oil absorption of 150 ml/100 g (commercially available as "Color Black FW200" from Degussa K.K.) was added. This was then stirred for one hour in a dissolver at a revolution of 5,000 rpm. The resulting dispersion separated into two layers of a supernatant layer and a precipitate layer after one night, and an ink composition could not be obtained.

TABLE 2

|  | Density with storage | Clogging with storage | Erasability |
|---|---|---|---|
| Example 1 | ⊚ | ⊚ | ○ |
| Example 2 | ⊚ | ○ | ○ |
| Example 3 | ⊚ | ⊚ | ⊚ |
| Example 4 | ⊚ | ⊚ | ⊚ |
| Example 5 | ⊚ | ○ | ⊚ |
| C. Ex. 1 | Δ | Δ | Δ |
| C. Ex. 2 | x | x | ○ |
| C. Ex. 3 | Ink composition could not be obtained. | | |

The aqueous black ink composition of the present invention employs the oxidized carbon black as a colorant, and it has improved dispersibility in an aqueous medium.

Therefore, decreasing of density due to coagulation and precipitation of the carbon black does not occur for a long period of time, and dispersion stability and storage stability of the ink composition are excellent. The ink composition also shows good moisture retention, and therefore clogging of the penpoint, or breaking of the written ink does not occur, and smooth writing in dark color is obtained.

Good erasability is also maintained in the ink composition due to a combination of the release agent emulsion and the oxidized carbon black.

The aqueous black ink composition of the present invention employs an aqueous medium as medium, and no odor of volatile organic solvent which is detrimental to environmental safety, is emitted.

What is claimed is:

1. An aqueous black ink composition for a writing board comprising:
   (a) water;
   (b) 0.5 to 20% by weight based on the aqueous black ink composition of oxidized carbon black obtained by oxidizing carbon black using hypohalogenous acid and/or a salt thereof;
   (c) 1 to 20% by weight based on the aqueous black ink composition of at least one film forming agent selected from the group consisting of polyvinyl acetate, polyvinyl formal, polyvinyl acetal, polyvinyl alcohol, a water soluble acrylic resin, a water soluble maleic resin, and emulsions of an alkyd resin, an urethane resin and an acrylic resin; and
   (d) 50 to 200% by weight based on the total amount of the oxidized carbon black and the film forming agent, of a release agent which is at least one higher fatty ester selected from the group consisting of myristyl caproate, isostearyl caproate, oleyl caproate, isostearyl caprylate, oleyl caprylate, stearyl 2-ethoxyhexanoate, isostearyl 2-ethylhexanoate, oleyl 2-ethylhexanoate, cetyl 2-ethylhexanoate, isooctadecyl caprate, oleyl caprate, isooctyl palmitate, isooctadecyl palmitate, diethylene glycol monobutyl palmitate, isooctyl stearate, isooctadecyl stearate, isostearyl isostearate, isocetyl isostearate, 2-ethylhexyl isostearate, isopropyl myristate, lauryl oleate, and butyl oleate.

2. The aqueous black ink composition for a writing board according to claim 1, wherein the oxidized carbon black has a surface active hydrogen content of not less than 1.5 mmol/g.

3. The aqueous black ink composition for a writing board according to claim 1, wherein the carbon black has an oil absorption of according to JIS-K6221 of not more than 150 ml/100 g.

4. The aqueous black ink composition for a writing board according to claim 1, wherein the oxidized carbon black has an average particle size of not more than 300 nm.

5. The aqueous black ink composition for a writing board according to claim 1, wherein the oxidized carbon black has an alkaline metal salt of an acidic group on the surface thereof.

6. A process for forming an aqueous black ink composition for a writing board, comprising:
   mixing 0.5 to 20% by weight based on the aqueous black ink composition of carbon black with water;
   oxidizing the carbon black in water using hypohalogenous acid and/or salt thereof as an oxidizing agent;
   adding 1 to 20% by weight based on the aqueous black ink composition of at least one film forming agent selected from the group consisting of polyvinyl acetate, polyvinyl formal, polyvinyl acetal, polyvinyl alcohol, a water soluble acrylic resin, a water soluble maleic resin, and emulsions of an alkyd resin, an urethane resin and an acrylic resin, 50 to 200% by weight based on the oxidized carbon black of a release agent which is at least one higher fatty ester selected from the group consisting of myristyl caproate, isostearyl caproate, oleyl caproate, isostearyl caprylate, oleyl caprylate, stearyl 2-ethylhexanoate, isostearyl 2-ethylhexanoate, oleyl 2-ethylhexanoate, cetyl 2-ethylhexanoate, isooctadecyl caprate, oleyl caprate, isooctyl palmitate, isooctadecyl palmitate, diethylene glycol monobutyl palmitate, isooctyl stearate, isooctadecyl stearate, isostearyl isostearate, isocetyl isostearate, 2-ethylhexyl isostearate, isopropyl myristate, lauryl oleate, and butyl oleate, and additives to the aqueous dispersion of the oxidized carbon black; and
   stirring until the resulting dispersion becomes uniform.

7. The process for forming an aqueous black ink composition for a writing board according to claim 6, wherein the carbon black has an oil absorption of according to JIS-K6221 of not more than 150 ml/100 g.

8. The process for forming an aqueous black ink composition for a writing board according to claim 6, wherein the hypohalogenous acid and/or salt thereof is selected from the group consisting of sodium hypochlorite and potassium hypochlorite.

9. A process for forming an aqueous black ink composition for a writing board, comprising:
   mixing 0.5 to 20% by weight based on the aqueous black ink composition of carbon black with water;
   stirring the resulting mixture until the carbon black particles have an average particle size of not more than 300 nm;

oxidizing the carbon black in water using hypohalogenous acid and/or salt thereof as an oxidizing agent;

adding 1 to 20% by weight based on the aqueous black ink composition of at least one film forming agent selected from the group consisting of polyvinyl acetate, polyvinyl formal, polyvinyl acetal, polyvinyl alcohol, a water soluble acrylic resin, a water soluble maleic resin, and emulsions of an alkyd resin, an urethane resin and an acrylic resin, 50 to 200% by weight based on the oxidized carbon black of a release agent which is at least one higher fatty ester selected from the group consisting of myristyl caproate, isostearyl caproate, oleyl caproate, isostearyl caprylate, oleyl caprylate, stearyl 2-ethylhexanoate, isostearyl 2-ethylhexanoate, oleyl 2-ethylhexanoate, cetyl 2-ethylhexanoate, isooctadecyl caprate, oleyl caprate, isooctyl palmitate, isooctadecyl palmitate, diethylene glycol monobutyl palmitate, isooctyl stearate, isooctadecyl stearate, isostearyl isostearate, isocetyl isostearate, 2-ethylhexyl isostearate, isopropyl myristate, lauryl oleate, and butyl oleate, and additives to the aqueous dispersion of the oxidized carbon black; and stirring until the resulting dispersion becomes uniform.

10. The process for forming an aqueous black ink composition for a writing board according to claim 9, wherein the carbon black has an oil absorption of according to JIS-K6221 of not more than 150 ml/100 g.

11. The process for forming an aqueous black ink composition for a writing board according to claim 9, wherein the hypohalogenous acid and/or salt thereof is selected from the group consisting of sodium hypochlorite and potassium hypochlorite.

* * * * *